Sept. 23, 1969   W. N. NIETZEL   3,468,566
CONDUIT COUPLING

Filed Oct. 10, 1967   3 Sheets-Sheet 1

Walter N. Nietzel   INVENTOR

BY *Richard L. Cannaday*
ATTORNEY

Walter N. Nietzel INVENTOR

BY Richard L. Cannaday
ATTORNEY

# United States Patent Office 3,468,566
Patented Sept. 23, 1969

3,468,566
CONDUIT COUPLING
Walter N. Nietzel, 307 Prospect Ave.,
Cranford, N.J. 07016
Filed Oct. 10, 1967, Ser. No. 674,305
Int. Cl. F16l 19/06, 21/02, 17/00
U.S. Cl. 285—341    3 Claims

ABSTRACT OF THE DISCLOSURE

A conduit coupling employing an externally tapering, internally shouldered and deformable ferrule and internally tapering, relatively harder and mutually joinable compression and adapter fittings which grip upon the ferrule causing it to make tight end and circumferential contacts with axially aligned conduit members fitted into and against it.

DESCRIPTION OF THE INVENTION

This invention relates to a conduit coupling. It relates particularly to a conduit coupling which is made up without the use of any permanent joining means such as welding or brazing metal or a cement. It relates more particularly to a conduit coupling which is made up with a ferrule having an external taper in at least one direction, this ferrule surrounding the joined end region of a conduit coupled to another conduit or to a conduit fitting. It relates still more particularly to such a conduit coupling in which the ferrule is relatively soft with respect to and enclosed and borne upon by a compression fitting which is internally tapered at an included angle somewhat smaller than that of the external taper of the ferrule, and it relates even still more particularly to a conduit coupling of the kind described in which the ferrule has at least one internal shoulder surface against which the joined end region of a coupled conduit abuts and is located.

It is an object of this invention to provide a coupling whereby and wherethrough conduits and conduit fittings of a wide range of sizes and end configurations may be joined rapidly and easily in fluid-tight relation.

It is another object of this invention to provide a coupling whereby and wherethrough a ruptured section of a conduit may be replaced without any substantial dismantling of the sound sections on either side of the ruptured section.

These and other objects and advantages of this invention as well as its nature and substance will be more clearly perceived and fully understood by referring to the following description and claims taken in connection with the accompanying drawings in which:

Figure 1:
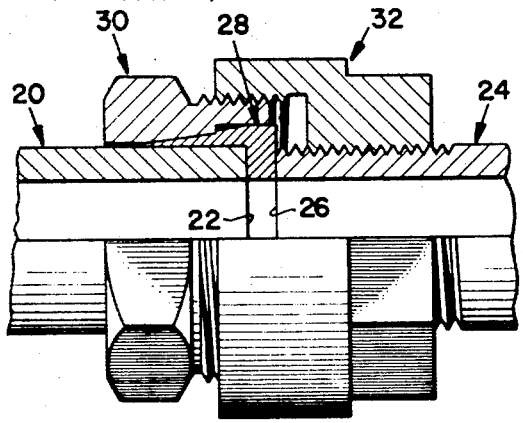
FIGURE 1 represents a side view, partly in section along a centerline plane, of a coupling according to this invention whereby and wherethrough an unthreaded end of one conduit is joined to an externally threaded end of another conduit.
Figures 2, 3:
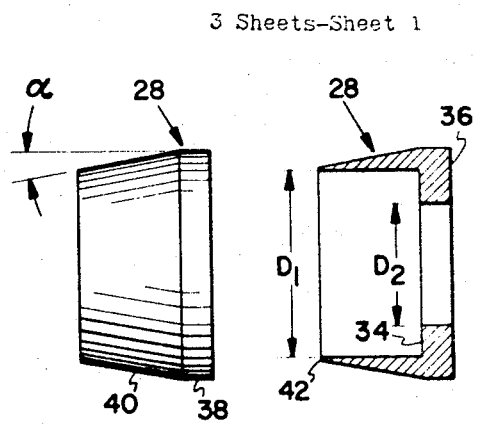
FIGURE 2 represents a side view of the ferrule employed in the coupling of FIGURE 1.
FIGURE 3 represents a side view in section along a centerline plane of the ferrule employed in the coupling of FIGURE 1.
Figure 4:
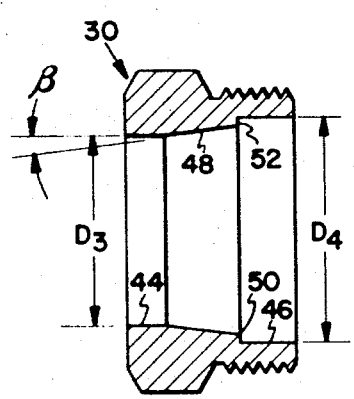
FIGURE 4 represents a side view in section along a centerline plane of the compression fitting employed in the coupling of FIGURE 1 which encloses and bears upon the ferrule of this coupling.

Referring now to the drawings in detail, especially FIGURES 1, 2, 3 and 4 thereof, a conduit 20 has an end region which is smooth or unthreaded both externally and internally, and this end region has an end surface 22. A conduit 24 has an end region, which is smooth internally but threaded externally, and this end region has an end surface 26. Conduit end surfaces 22 and 26 are held apart by a ferrule 28. Enclosing at least a substantial portion of this ferrule is a compression fitting 30. This fitting is threaded externally for part of its length, and is in screwed engagement with an adapter fitting 32. This latter fitting is threaded internally on two different diameters. Its larger diameter threads are engaged with those of compression fitting 30 while its smaller diameter threads are engaged with those of conduit 24. Conveniently but not necessarily, the threads whereon fittings 30 and 32 are engaged will be straight while those whereon fitting 32 and conduit 24 are engaged will be tapered.

Ferrule 28 has a larger inside diameter $D_1$ and a smaller inside diameter $D_2$. Diameter $D_1$ should be such to make the ferrule a close sliding fit but not a force or driving fit over the smooth end region of conduit 20. Diameter $D_2$ should be sufficiently small to provide a substantial internal shoulder surface 34 to be in contact with conduit end surface 22, but it should not be smaller than the smaller of the bores of conduits 20 and 24 in case these conduits be of unequal bore. If they be of essentially identical bore, $D_2$ should be no smaller than this bore to avoid creating a restriction in the passage from conduit to conduit through the coupling.

At its right hand end as shown, ferrule 28 has an end surface 36 to be in contact with conduit end surface 26. For a short distance to the left of end surface 36, ferrule 28 has an outer surface 38 of substantially uniform diameter. In the greater part of its length, however, the ferrule has an outer surface 40 which is tapered at a small angle $\alpha$, about 10° for example, measured either side of the axial centerline. The included angle of tapered surface 40 is $2\alpha$, about 20° for example, and this surface extends far enough axially to bring ferrule 28 down to a rather fine, edgelike end surface 42 at its left hand end.

Compression fitting 30 is slightly longer axially than ferrule 28. It has a rather short interior region at its left hand end bounded by surface 44 with a substantially uniform diameter $D_3$ which is large enough to allow fitting 30 to pass over and turn somewhat loosely upon conduit 20. The compression fitting has a somewhat longer but still rather short interior region at its right hand end bounded by surface 46 with a substantially uniform diameter $D_4$ which is not only larger than diameter $D_3$ but also large enough for surface 46 to slip over and have a somewhat loose turning fit on surface 38 of ferrule 28.

A surface 48 of gradually increasing diameter extends to the right from surface 44. This tapered surface does not, however, enlarge to a diameter as great as $D_4$. It stops somewhat short of this to provide a sharp corner 50 and a shoulder surface 52 within compression fitting 30. The taper of surface 48 is at a small angle $\beta$, about 8° for example, measured either side of the axial centerline. The included angle of tapered surface 48 is $2\beta$, about 16° for example. Whatever the absolute value of angle $\beta$ for any particular compression fitting 30, it should be at least slightly less than that of angle $\alpha$ for the given ferrule 28 with which the compression fitting is to be used.

The material of ferrule 28 should be one which is at least somewhat softer than that of conduits 20 and 24. It should also be softer than that of the fittings such as 30 and 32 used with these and other conduits in the several illustrated embodiments of the coupling of this invention. Said in other words, ferrule 28 and any other ferrule employed according to this invention should be the softest element of the coupling assembly in which it is used. Conduit and fitting elements including 20, 24, 30, 32, and others designated hereinafter will often be composed of materials such as steel, cast and wrought iron, brass, medium hard copper, and rigid plastic. For purposes of this invention, ferrule elements including 28 and others designated hereinafter may be any relatively easily deformable material which will yield plastically to conform to sometimes rough and generally harder bounding surfaces.

Particular suitable materials for ferrule 28 include Teflon (tetrafluoroethylene polymer), rubber, neoprene (polymerized chloroprene), soft copper, and soft lead. Of course these named materials, like those for the conduits and conduit fittings, are cited only by way of example and not of limitation. In any given case the ferrule material will, it is understood, be chosen to be substantially unaffected chemically by and itself have no reactive effect upon whatever fluid is to flow through conduits 20 and 24. It is understood also that conduits 20 and 24 need not be fluid-conveying conduits.

The coupling shown in FIGURE 1 may be assembled in the following exemplary way. First adapter fitting 32 is screwed onto conduit 24 in the orientation shown, that is, with its end threaded on a larger diameter directed toward conduit end surface 26, until the engaged threads of these two parts seize. Next compression fitting 30 is slipped well onto conduit 20 in the orientation shown, that is, with its threaded end directed toward conduit end surface 22. Next ferrule 28 is slipped onto conduit 20, and ferrule shoulder surface 34 pressed firmly against conduit end surface 22. Next conduits 20 and 24 are brought into axial alignment with end surface 36 of ferrule 28 pressed firmly against end surface 26 of conduit 24. Next compression fitting 30 is brought into threaded engagement with adapter fitting 32, and then screwed into this latter fitting until its motion is finally stopped by its heavy bearing upon and deformation of ferrule 28. It is by means of this bearing and deformation that the coupling of the two conduits is rendered fluid-tight, and these effects will accordingly be described in some detail.

Since included angle $2\beta$ of tapered inner or interior surface 48 of compression fitting 30 is at least slightly smaller than included angle $2\alpha$ of tapered outer or exterior surface 40 of ferrule 28, surface 48 of fitting 30 will tend to squeeze in on surface 40 of ferrule 28 to compress the interior surface of the ferrule of diameter $D_1$ against and conform it plastically to the lateral exterior surface of the end region of conduit 20 as the compression fitting is screwed into the adapter fitting. At least part of ferrule surface 40 will, of course, be conformed to compression fitting surface 48. Likewise, ferrule 28 will tend to be extruded leftward at its edgelike end surface 42 to fill into any annular space between interior surface 44 of the compression fitting and the lateral exterior surface of conduit 20.

Another effect that will be realized from included angle $2\beta$ being smaller than included angle $2\alpha$ is that as compression fitting 30 is screwed into adapter fitting 32 sharp corner 50 of the compression fitting will dig into exterior surface 40 of the ferrule, and shoulder surface 52 of this fitting will tend to drive ferrule 28 and conduit 20 gripped by the ferrule to the right. This will substantially increase any existing or initial contact pressure between end surface 36 of ferrule 28 and end surface 26 of conduit 24. The former surface will accordingly be conformed to the latter in their area of compressive contact.

As the effects just described are achieved, screw turning of compression fitting 30 into adapter fitting 32 will become more and more difficult with tighter squeezing of ferrule 28 by compression fitting tapered surface 48 and harder driving of it by shoulder surface 52 of this fitting. Coincidentally with these effects, however, the coupling of this invention shown in FIGURE 1 will become more and more tightly sealed on at least two important element interfaces against any later applied fluid pressure. One of these interfaces is that between the interior surface of diameter $D_1$ of ferrule 28 and the lateral exterior surface of conduit 20 adjacent conduit end surface 22. The other is that between at least part of end surface 36 of ferrule 28 and at least part of end surface 26 of conduit 24. The degree of difficulty of screw turning of compression fitting 30 into adapter fitting 32 corresponding to adequately tight sealing at these interfaces will be determined by experience.

With the two designated interfaces sealed, no path will exist whereby fluid under pressure in conduits 20 and 24 can escape through the coupling of FIGURE 1. Furthermore, although conduit 20 is not held positively axially within this coupling as by a screw thread, the frictional forces effectively existing between the outer surface of the illustrated end region of this conduit and the inner surface of diameter $D_1$ of ferrule 28 will be so high that the coupling will have entirely adequate longitudinal or tensile strength for any reasonable service in which it may be used.

In keeping with practices of the prior art, a sealing agent or pipe dope such as litharge and glycerine may be smeared on the threads of conduit 24 and fittings 30 and 32 before the coupling of FIGURE 1 is assembled. Employment of such a measure, while at least not affirmatively objectionable and possibly somewhat desirable in certain circumstances as a matter of mechanics' routine, does not detract from the capability of the coupling of this invention to be fully sealed along interfaces between the ferrule and the conduits pointed out hereinbefore.

It will be appreciated without difficulty by those skilled in the art that there is no inherent upper limitation on the size of conduits with which the coupling of this invention illustrated in FIGURE 1 may be used. The only lower limitation is that conduit 20 or its equivalent not be so relatively thin walled as to crush or crumple in its end region whereon radial force is exerted by the ferrule as the compression and adapter fittings are joined. It will be appreciated further that in a given joint formed by the coupling of FIGURE 1, the jointed conduits need not be identical with respect to either inside or outside diameter. It will be appreciated still further that the compression and adapter fittings may be joined by means other than screw threads, means such as bolts or clamps, for example.

While the coupling of this invention shown in FIGURE 1 is one of general utility for the joining of conduits, a particular and significant instance in which this coupling will have unusually great value is that in which a conduit of a more or less continuous nature or one which is more or less permanently retained in foundations or fittings has suffered a local rupture. To mend this conduit after fluids flowing through it have been shut off, the local section wherein the rupture is located, that is, the ruptured section, is first cut out and the newly cut end surfaces of the sound sections on either side of the removed section left or subsequently finished as square as reasonably possible. This cutting and finishing may be done with either hand or light power tools in the great majority of practical cases.

The next step is to procure a piece of conduit of diametral size suitable to be a replacement for the ruptured section of the conduit being mended. Two each of ferrules, compression fittings and adapter fittings are procured also. The distance between the squared end surfaces of the sound sections of the original conduit is measured, and the piece of replacement conduit is cut to such a length that with a ferrule applied snugly to either end of it a conduit and ferrule subassembly will be provided having an overall length essentially equal to the measured distance. Said in other words, the replacement section of conduit carrying the two ferrules should be a close fit between the squared end surfaces of the sound sections of the original conduit.

The next step is to cut external threads for the adapter fittings on the end regions of the two sound sections of the original conduit extending back from their squared end surfaces. These end regions will thus be rendered generally similar in appareance to the illustrated end region of conduit 24, but with the difference or at least the particular requirement that the threads on them be cut back for enough along their lengths that their adapter fittings can be screwed on for distance to bring the end surfaces of the enlarged ends of these fittings at least flush with the squared end surfaces of the sound sections of the original conduit. Straight threads on these original conduit sections may be preferable to tapered threads in this situation, with the adapter fitting threads of smaller diameter being of a correspondingly straight nature. The threading of the end regions of the two sound sections of the original conduit, like the aforementioned cutting and finishing, may be effected in most cases with either hand or light power tools.

The next step is to actually screw the adapter fittings onto the newly threaded end regions of the sound sections of the original conduit, running these fittings on far enough that the end surfaces of their enlarged ends are at least flush with the sound conduit section end surfaces. The next step is to slip the two compression fittings onto the replacement conduit section, first removing the ferrules from this section if previously applied thereto for experimental length determination purposes. The next step is to install a ferrule on each end of the replacement conduit section. The next step is to set the replacement conduit section carrying the compression fittings and the ferrules in place between the end surfaces of the two sound sections of the original conduit.

The final step, performed at each end of the replacement conduit, is to bring together in threaded engagement the matching compression and adapter fittings. Assuming straight threads on the sound sections of the original conduit, each adapter fitting is run out beyond the end of the sound section of the original conduit whereon it is supported, substantially as adapter fitting 32 overhangs end surface 26 of conduit 24, and the matching compression fitting is screwed into it to drive and deform in the manner described hereinbefore the ferrule which it, the compression fitting encloses. With the driving and deformation, seals are made at least between the ferrules and the end surfaces of the sound sections of the original conduit, and between the ferrules and the lateral exterior surfaces of the replacement conduit adjacent its ends. Mending of the ruptured conduit is now complete, and it is to be noted especially that this mending has been effected without any significant dismantling or other disturbance of the sound sections of the conduit on either side of the ruptured section.

Figure 5:
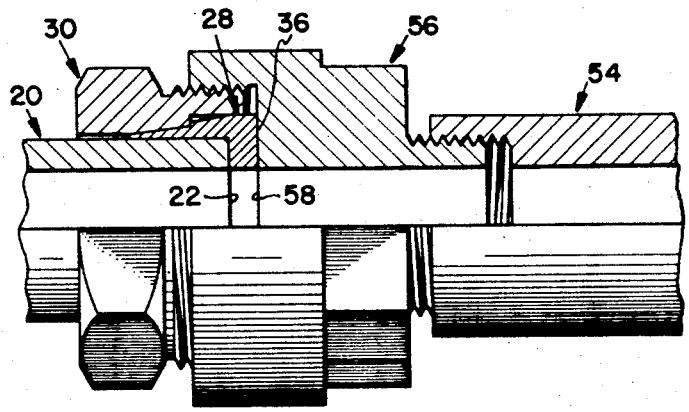
FIGURE 5 represents a side view, partly in section along a centerline plane, of a coupling accordance to this invention whereby and wherethrough an unthreaded end of one conduit is joined to an internally threaded end of another conduit.

Referring next to FIGURE 5, conduit 20, ferrule 28, and compression fitting 30 are as shown in FIGURE 1. Conduit 54 to which conduit 20 is joined is smooth externally but threaded internally at its coupled end. Screwed within conduit 54 is one end of an adapter fitting 56 which is in threaded engagement at its other and larger end with compression fitting 30, and which has an internal shoulder surface 58 adjacent this larger end. When compression fitting 30 is screwed into adapter fitting 56 to drive and deform ferrule 28, seals are made at least between end surface 36 of the ferrule and shoulder surface 58 of the adapter fitting, and between the bore surface of diameter $D_1$ of the ferrule and the lateral exterior surface of conduit 20 adjacent its end surface 22.

Figure 6:
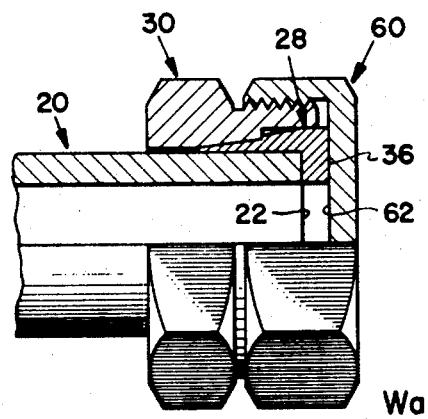
FIGURE 6 represents a side view, partly in section along a centerline plane, of a coupling according to this invention whereby and wherethrough an unthreaded end of a conduit is fitted with a cap.

Referring next to FIGURE 6, conduit 20, ferrule 28, and compression fitting 30 are as shown in FIGURE 1. Cap 60 with which conduit 20 is closed is in threaded engagement with compression fitting 30, and has an inner diametral surface 62. When compression fitting 30 is screwed into cap 60 to drive and deform ferrule 28, seals are made at least between end surface 36 of the ferrule and diametral surface 62 of the cap, and between the bore surface of diameter $D_1$ of the ferrule and the lateral exterior surface of conduit 20 adjacent its end surface 22.

Figure 7:
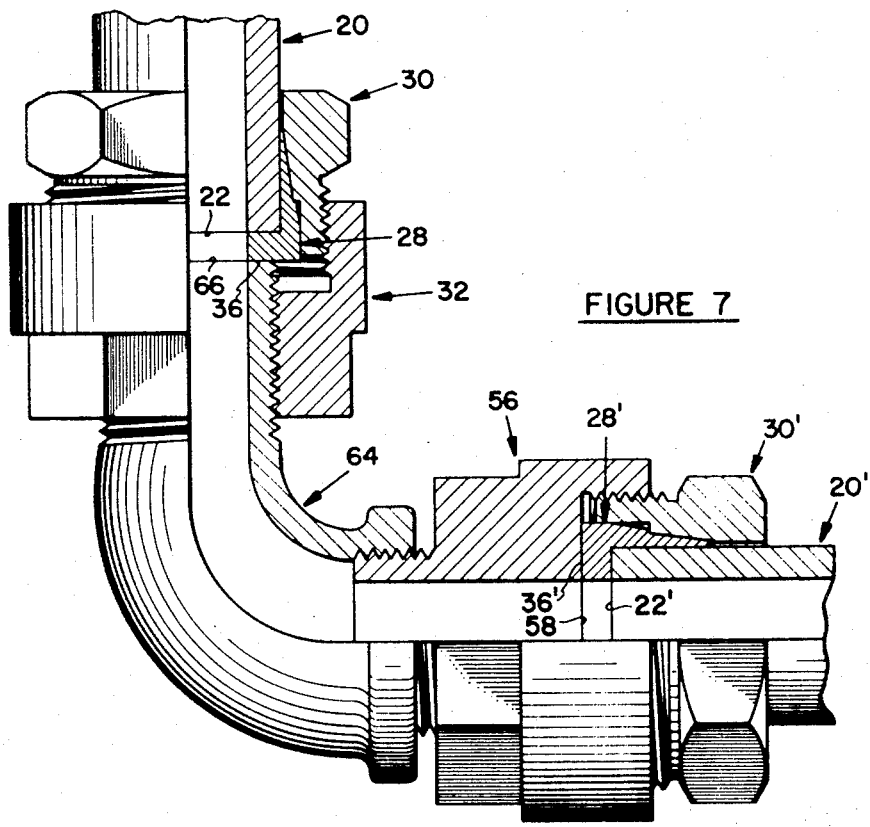
FIGURE 7 represents a side view, partly in section along a centerline plane, of couplings according to this invention whereby and wherethrough an unthreaded end of one conduit is joined to an externally threaded end of a second conduit, and an internally threaded end of this second conduit is joined to an unthreaded end of a third conduit.

Referring next to FIGURE 7, conduit 20, ferrule 28, compression fitting 30, and adapter fitting 32 are as shown in FIGURE 1. Similar to some of these parts are conduit 20′, ferrule 28′, and compression fitting 30′. Adapter fitting 56 is as shown in FIGURE 5. The internal threads of smaller diameter of adapter fitting 32 are engaged with external threads at one end of conduit member 64 in the form of an elbow which has an end surface 66 by these threads. The external threads of adapter fitting 56 are engaged with internal threads at the other end of elbow 64. When compression fitting 30 is screwed into adapter fitting 32 to drive and deform ferrule 28, seals are made at least between end surface 36 of the ferrule and end surface 66 of the elbow, and between the bore surface of diameter $D_1$ of the ferrule and the lateral exterior surface of conduit 20 adjacent its end surface 22. When compression fitting 30′ is screwed into adapter fitting 56 to drive and deform ferrule 28′, seals are made at least between end surface 36′ of the ferrule and shoulder surface 58 of the adapter fitting, and between bore surface of diameter $D_1$ of the ferrule and the lateral exterior surface of conduit 20′ adjacent its end surface 22′.

Figure 8:
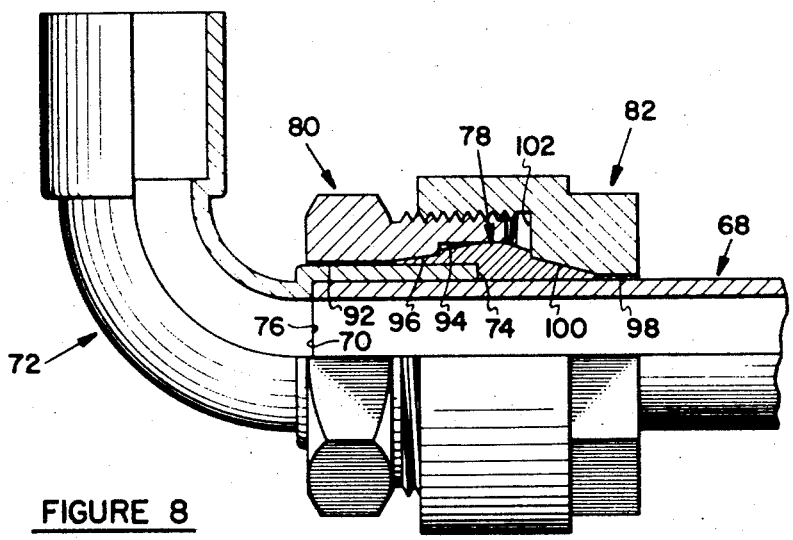
FIGURE 8 represents a side view, partly in section along a centerline plane, of a coupling according to this invention whereby and wherethrough an unthreaded end of one conduit is joined to an unthreaded end of another conduit with the joined end of one conduit being fitted and shouldered inside that of the other.
Figure 9:
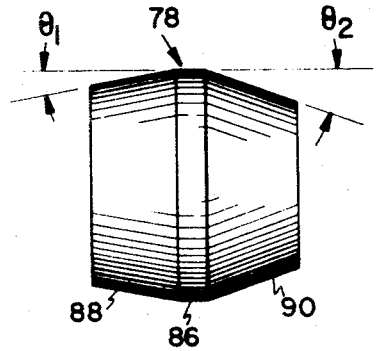
FIGURE 9 represents a side view of the ferrule employed in the coupling of FIGURE 8.
Figure 10:
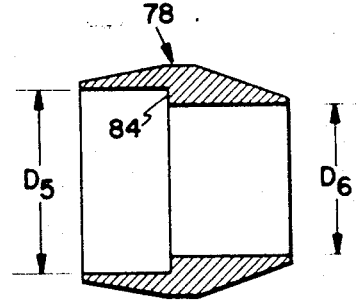
FIGURE 10 represents a side view in section along a centerline plane of the ferrule employed in the coupling of FIGURE 8.

Referring next to FIGURES 8, 9, and 10, a conduit 68 has an end region which is smooth or unthreaded both externally and internally, and this end region has an end surface 70. A conduit 72 in the form of an elbow has an enlarged end region which is smooth both externally and internally, and into which the illustrated end region of conduit 68 is fitted. This end region of conduit 72 has an end surface 74 and an internal shoulder surface 76 against which end surface 70 of conduit 68 abuts. Enclosing a portion of the end region of conduit 72 extending back from end surface 74 thereof is a ferrule 78. This ferrule also encloses a portion of conduit 68 extending back from the end region thereof overlapped by the end region of conduit 72. The ferrule itself is enclosed by compression fittings 80 and 82 which are in screwed engagement with each other, fitting 80 being threaded externally and fitting 82 being threaded internally. Conveniently but not necessarily, the threads whereon these two fittings are engaged will be straight threads.

Ferrule 78 has a larger inside diameter $D_5$ and a smaller inside diameter $D_6$. Diameter $D_5$ should be such to make the ferrule a close sliding fit but not a force or driving fit over the smooth, enlarged end region of conduit 72. Diameter $D_6$ should provide a similar fit of ferrule 78 over the lateral exterior surface of conduit 68. Because of and corresponding to its different inside diameters, the ferrule has an internal shoulder surface 84 which abuts conduit end surface 74 in the assembled coupling shown in FIGURE 8. In its central region, ferrule 78 has an outer surface 86 of substantially uniform diameter. To the left of this, however, the ferrule has an outer surface 88 which is tapered at a small angle $\theta_1$ measured either side of the axial centerline for an included angle of this surface of $2\theta_1$. To the right of its central region, ferrule 78 has an outer surface 90 which is tapered at a somewhat larger but still relatively small angle $\theta_2$ measured either side of the axial centerline for an included angle of this surface of $2\theta_2$.

Compression fitting 80 has a rather short interior region at its left hand end bounded by surface 92 with a substantially uniform diameter. This diameter is large enough to allow fitting 80 to pass over and turn somewhat loosely upon the enlarged end region of conduit 72. At its right hand end, compression fitting 80 has an interior region bounded by surface 94 with a substantially uniform diameter. This diameter is not only larger than the diameter of surface 92 but also large enough for surface 94 to slip over and have a somewhat loose turning fit on surface 82 of ferrule 78. A surface 96 of gradually increasing diameter extends to the right from surface 92. This tapered surface does not, however, enlarge to a diameter as great as that of surface 94. It stops somewhat short of this to provide a sharp corner and a shoulder surface within compression fitting 80 similar to those within compression fitting 30. Whatever the absolute value of the included angle of tapered surface 96 for any particular fitting 80, it should be at least slightly less, about 4° less, for example, than that of included angle $2\theta_1$ for the given ferrule 78 with which the compression fitting is to be used.

Compression fitting 82 has a rather short interior region at its right hand end bounded by surface 98 with a substantially uniform diameter. This diameter is large enough to allow fitting 82 to pass over and turn somewhat loosely upon conduit 68. A surface 100 of gradually increasing diameter extends to the left from surface 98. This tapered surface comes to a sharp corner, similar to that within compression fitting 30, wherefrom a shoulder surface 102 extends outwardly to essentially the diameter on which compression fitting 82 is provided with internal threads. Whatever the absolute value of the included angle of tapered surface 100 for any particular fitting 82, it should be at least slightly less, about 4° less, for example, than that of included angle $2\theta_2$ for the given ferrule 78 with which the compression fitting is to be used.

The coupling shown in FIGURE 8 may be assembled in the following exemplary way. First compression fitting 80 is slipped well onto conduit 72 in the orientation shown. Next ferrule 78 is slipped onto conduit 72, and ferrule shoulder surface 84 pressed firmly against conduit end surface 74. Next compression fitting 82 is slipped well onto conduit 68 in the orientation shown. Next conduit 68 is brought into axial alignment with ferrule 78, and slipped through this ferrule and through the enlarged end region of conduit 72 until its end surface 70 makes contact with internal shoulder surface 76 of the latter conduit. Next compression fittings 80 and 82 are brought into threaded engagement, and the former screwed into the latter until relative rotary motion between these two fittings is finally stopped by their heavy bearing upon and deformation of ferrule 78. It is by means of this bearing and deformation that the coupling of conduit 68 and 72 is rendered fluid-tight, and these effects will accordingly be described in some detail.

Since the included angle of tapered inner or interior surface 96 of compression fitting 80 is at least slightly smaller than included angle $2\theta_1$ of tapered outer or exterior surface 88 of ferrule 78, surface 96 of the fitting 80 will tend to squeeze in on surface 88 of ferrule 78 to compress the interior surface of the ferrule of diameter $D_5$ against and conform it plastically to the lateral exterior surface of a portion of the enlarged end region of conduit 72 back from end surface 74. Likewise, since the included angle of the tapered inner or interior surface 100 of compression fitting 82 is at least slightly smaller than included angle $2\theta_2$ of tapered outer or exterior surface 90 of ferrule 78, surface 100 of fitting 82 will tend to squeeze in on surface 90 of ferrule 78 to compress the interior surface of the ferrule of diameter $D_6$ against and conform it plastically to the lateral exterior surface of a portion of conduit 68 back from the portion thereof which is overlapped by the enlarged end region of conduit 72.

Another effect that will be realized from the included angle of tapered interior surface 96 of compression fitting 80 being smaller than included angle $2\theta_1$ of ferrule surface 88 is that as the compression fittings are screwed together the sharp corner at the leading edge of tapered surface 96 will dig into exterior surface 88 of the ferrule, and the shoulder surface beyond this corner will tend to drive ferrule 78 and conduit 72 gripped by this ferrule to the right. Likewise, another effect that will be realized from the included angle of tapered interior surface 100 of compression fitting 82 being smaller than included angle $2\theta_2$ of ferrule surface 90 is that as the compression fittings are screwed together the sharp corner at the leading edge of tapered surface 100 will dig into exterior surface 90 of the ferrule, and shoulder surface 102 beyond this corner will tend to drive ferrule 78 and conduit 68 gripped by this ferrule to the left.

There will be at least two further significant effects flowing from those just described. One of these is that end surface 70 of conduit 68 will be pressed with increasing firmness against internal shoulder surface 76 of conduit 72, insuring full benefit to the coupling of all available overlap on conduit 68 of the enlarged end region of conduit 72. The other of these is that the central region of ferrule 78 between the internal shoulder surfaces of fittings 80 and 82 will be compressed axially, and so will tend to flow radially. This radial flow will tend to create pressure between outer surface 86 of the ferrule and inner surface 94 of compression fitting 80. More important, however, this radial flow will tend to increase existing pressure between the interior surfaces of ferrule 78 and the lateral exterior surfaces of conduits 68 and 72.

As the several foregoing effects are achieved, screw turning of compression fitting 80 into compression fitting 82 will become more and more difficult with tighter squeezing of ferrule 78 by tapered surfaces 96 and 100 of the compression fittings, and harder driving of it by the internal shoulder surfaces of these fittings. Coincidentally with these effects, however, the coupling of this invention shown in FIGURE 8 will become more and more tightly sealed on at least two important element interfaces against any later applied fluid pressure. One of these interfaces is that between the interior surface of diameter $D_5$ of ferrule 78 and the lateral exterior surface of the enlarged end region of conduit 72 back from end surface 74. The other is the interface between the interior surface of diameter $D_6$ of ferrule 78 and the lateral exterior surface of conduit 68. The degree of difficulty of screw turning of compression fitting 80 into compression fitting 82 corresponding to adequately tight sealing at these interfaces will be determined by experience. Once the two designated interfaces are sealed, however, no path will exist whereby fluid under pressure in conduits 68 and 72 can escape through the coupling of FIGURE 8.

Figure 11:
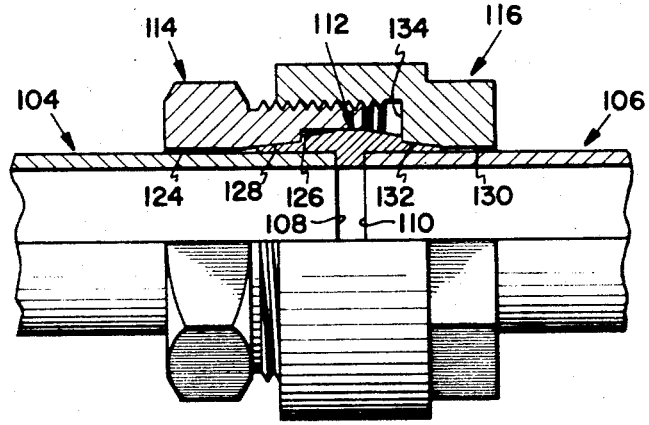
FIGURE 11 represents a side view, partly in section along a centerline plane, of a coupling according to this invention whereby and wherethrough an unthreaded end of one conduit is joined to an unthreaded end of another conduit without the joined end of either conduit being fitted inside that of the other.
Figure 12:
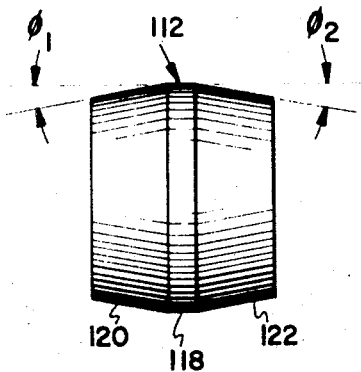
FIGURE 12 represents a side view of the ferrule employed in the coupling of FIGURE 11.
Figure 13:
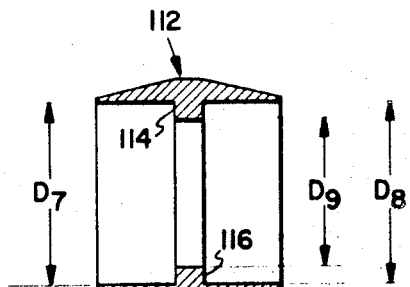
FIGURE 13 represents a side view in section along a centerline plane of the ferrule employed in the coupling of FIGURE 11.

Referring finally to FIGURES 11, 12, and 13, conduits 104 and 106 have end regions which are smooth or unthreaded both externally and internally. The end region of conduit 104 has an end surface 108, and the end region of conduit 106 has an end surface 110. These end surfaces are held apart by a ferrule 112 which encloses at least portions of the end regions of conduits 104 and 106. The ferrule itself is enclosed by compression fittings 114 and 116 which are in screwed engagement with each other, fitting 114 being threaded externally and fitting 116 being threaded internally. Conveniently but not necessarily, the threads whereon these two fittings are engaged will be straight threads.

Ferrule 112 has three diameters, $D_7$, $D_8$, and $D_9$. Diameters $D_7$ and $D_8$ may be essentially identical, or they may be significantly different. Regardless of the relation between diameters $D_7$ and $D_8$, however, diameter $D_9$ will be smaller than either of these to provide ferrule 112 with two internal shoulder surfaces, 114 and 116. Diameters $D_7$ and $D_8$ should be such to make the ferrule a close sliding fit but not a force or driving fit over the smooth end regions of conduits 104 and 106 respectively. Diameters $D_9$ should be sufficiently small that the internal shoulder surfaces of the ferrule which conduit end surfaces 108 and 110 abut are of substantial area, but it should not be smaller than the smaller of the bores of conduits 104 and 106 in case those conduits be of unequal bore. If they be of essentially identical bore, $D_9$ should be no smaller than this bore to avoid creating a restriction in the passage from conduit to conduit through the coupling.

In its central region, ferrule 112 has an outer surface 118 of substantially uniform diameter. To the left of this, however, the ferrule has an outer surface 120 which is tapered at a small angle $\phi_1$ measured either side of the axial centerline for an included angle of this surface of $2\phi_1$. To the right of its central region, ferrule 112 has an outer surface of 122 which is tapered at a small angle $\phi_2$ measured either side of the axial centerline for an included angle of this surface of $2\phi_2$. A common usage of ferrule 112 will be in a coupling whereby and wherethrough conduits of essentially identical outside diameters are joined. In this case included angles $2\phi_1$ and $2\phi_2$ may be equal, and the whole ferrule of symmetrical form at least externally. It is to be understood clearly, however, that ferrule 112 may be used in a coupling according to this invention for joining conduits which are of unequal outside as well as unequal inside diameters, and that in such circumstances there may be a significant difference between included angle $2\phi_1$ and included angle $2\phi_2$.

Compression fitting 114 has a rather short interior region at its left hand end bounded by surface 124 with a substantially uniform diameter. This diameter is large enough to allow fitting 114 to pass over and turn somewhat loosely upon conduit 104. At its right hand end, compression fitting 114 has an interior region bounded by surface 126 with a substantially uniform diameter. This diameter is not only larger than the diameter of surface 124 but also large enough for surface 126 to slip over and have a somewhat loose turning fit on surface 118 of ferrule 112. A surface 128 of gradually increasing diameter extends to the right from surface 124. This tapered surface does not, however, enlarge to a diameter as great as that of surface 126. It stops somewhat short of this to provide a sharp corner and a shoulder surface within compression fitting 114 similar to those within compression fitting 30. Whatever the absolute value of the included angle of tapered surface 128 for any particular fitting 114, it should be at least slightly less, about 4° less, for example, than that of included angle $2\phi_1$, for the given ferrule 112 with which the compression fitting is to be used.

Compression fitting 116 has a rather short interior region at its right hand end bounded by surface 130 with a substantially uniform diameter. This diameter is large enough to allow fitting 116 to pass over and turn somewhat loosely upon conduit 106. A surface 132 of gradually increasing diameter extends to the left from surface 130. This tapered surface comes to a sharp corner, similar to that within compression fitting 30, wherefrom a shoulder surface 134 extends outwardly to essentially the diameter on which compression fitting 116 is provided with internal threads. Whatever the absolute value of the included angle of tapered surface 132 for any particular fitting, it should be at least slightly less, about 4° less, for example, than that of included angle $2\phi_2$ for the given ferrule 112 with which the compression fitting is to be used.

The coupling shown in FIGURE 11 may be assembled in the following exemplary way. First compression fitting 114 is slipped well onto conduit 104 in the orientation shown. Next ferrule 112 is slipped onto conduit 104, and ferrule shoulder surface 114 pressed firmly against conduit end surface 108. Next compression fitting 116 is slipped well onto conduit 106 in the orientation shown. Next conduit 106 is brought into axial alignment with ferrule 112, and slipped into and through this ferrule until its end surface 110 makes contact with internal shoulder surface 116 of the ferrule. Next compression fittings 114 and 116 are brought into threaded engagement, and the former screwed into the latter until relative rotary motion between these two fittings is finally stopped by their heavy bearing upon and deformation of ferrule 112. It is by means of this bearing and deformation that the coupling of conduits 104 and 106 is rendered fluid-tight, and these effects will accordingly be described in some detail.

Since the included angle of tapered inner or interior surface 128 of compression fitting 114 is at least slightly smaller than included angle $2\phi_1$ of tapered outer or exterior surface 120 of ferrule 112, surface 128 of fitting 114 will tend to squeeze in on surface 120 of ferrule 112 to compress the interior surface of the ferrule of diameter $D_7$ against and conform it plastically to the lateral exterior surface of the end region of conduit 104. Likewise, since the included angle of the tapered inner or interior surface 132 of compression fitting 116 is at least slightly smaller than included angle $2\phi_2$ of tapered outer or exterior surface 122 of ferrule 112, surface 132 of fitting 116 will tend to squeeze in on surface 122 of ferrule 112 to compress the interior surface of the ferrule of diameter $D_8$ against and conform it plastically to the lateral exterior surface of the end region of conduit 106.

Another effect that will be realized from the included angle of tapered interior surface 128 of compression fitting 114 being smaller than included angle $2\phi_1$ of ferrule surface 120 is that as the compression fittings are screwed together the sharp corner at the leading edge of tapered surface 128 will dig into exterior surface 120 of the ferrule, and the shoulder surface beyond this corner will tend to drive ferrule 112 and conduit 104 gripped by this ferrule to the right. Likewise, another effect that will be realized from the included angle of tapered interior surface 132 of compression fitting 116 being smaller than included angle $2\phi_2$ of ferrule surface 122 is that as the compression fittings are screwed together the sharp corner at the leading edge of tapered surface 132 will dig into exterior surface 122 of the ferrule, and shoulder surface 134 beyond this corner will tend to drive ferrule 112 and conduit 106 gripped by this ferrule to the left.

There will be at least one further significant effect flowing from those just described. This is that the central region of ferrule 112 between the internal shoulder surfaces of fittings 114 and 116 will be compressed axially and so will tend to flow radially. This radial flow will tend to create pressure between outer surface 118 of the ferrule and inner surface 126 of compression fitting 114. More important, however, this radial flow will tend to increase existing pressure between the interior surfaces of the ferrule of diameter $D_7$ and $D_8$ and the lateral exterior surfaces of the end regions of conduits 104 and 106.

As the several foregoing effects are achieved, screw turning of compression fitting 114 into compression fitting 116 will become more and more difficult with tighter squeezing of ferrule 112 by tapered surfaces 128 and 132 of the compression fittings, and harder driving of it by the internal shoulder surfaces of these fittings. Coincidentally with these effects, however, the coupling of this invention shown in FIGURE 11 will become more and more tightly sealed on at least two important element interfaces against any later applied fluid pressure. One of these interfaces is that between the interior surface of diameter $D_7$ of ferrule 112 and the lateral exterior surface of the end region of conduit 104. The other is the interface between the interior surface of diameter $D_8$ of ferrule 112 and the lateral exterior surface of the end region of conduit 106. The degree of difficulty of screw turning of compression fitting 114 into compression fitting 116 corresponding to adequately tight sealing at these interfaces will be determined by experience. Once the two designated interfaces are sealed, however, no path will exist whereby fluid under pressure in conduits 104 and 106 can escape through the coupling of FIGURE 11.

As the present invention may be embodied in several forms without departing from the spirit or essential characteristics thereof, the embodiments herein pictured and described in detail are therefore illustrative and not restrictive.

Thus, protection by Letters Patent of this invention in all its aspects as the same are set forth in the appended claims is sought to the broadest extent that the prior art allows.

I claim as my invention:

1. In a conduit coupling whereby at least one conduit member is coupled at an end region on a lateral exterior surface thereof terminating at an end surface, the improvement which comprises (1) a ferrule having (i) a lateral interior surface, (ii) an internal shoulder surface whereat said lateral interior surface terminates at one end, and (iii) a tapered exterior surface surrounding at least a substantial portion of said lateral interior surface and converging distantly from said internal shoulder surface to a relatively reduced end in the direction of the other end of said lateral interior surface, said lateral interior surface enclosing and being in contact with said lateral exterior surface of said end region of said one conduit member, and said internal shoulder surface being at least closely adjacent to said end surface thereof, and (2) a compression fitting surrounding said ferrule, said compression fitting having (i) an interior surface tapered in the same direction as said tapered exterior surface of said ferrule in an undeformed condition with said tapered interior surface enclosing and being in contact with at least a substantial portion of said tapered exterior surface and deforming the same plastically and compressing said lateral interior surface of said ferrule against said lateral exterior surface of said conduit member, the included angle of said tapered interior surface being at least slightly smaller than the included angle of said tapered exterior surface with said ferrule in an undeformed condition, and (ii) an internal shoulder surface extending outwardly from the relatively large end of its tapered interior surface and forming a corner thereat which is embedded in said tapered exterior surface of said ferrule and (3) means co-operating with said compression fitting for forcing said conduit, said ferrule and said compression fitting into engagement as described.

2. In a conduit coupling whereby a first conduit member is coupled at an end region on a lateral exterior surface thereof terminating at an end surface and a second conduit member extending into and shouldered within said end region of said first conduit member is coupled on a lateral exterior surface beyond said end surface of said first conduit member, the improvement which comprises (1) a ferrule having (i) a first lateral interior surface, (ii) a second lateral interior surface of smaller diameter extending from one end of said first lateral interior surface, (iii) an internal shoulder surface at the adjacent ends of said first and second lateral interior surfaces, (iv) a first tapered exterior surface surrounding at least a substantial portion of said first lateral interior surface and converging distantly from said internal shoulder surface to a relatively reduced end in the direction of the end of said first lateral interior surface removed from said internal shoulder surface, and (v) a second tapered exterior surface surrounding at least a substantial portion of said second lateral interior surface and converging distantly from said internal shoulder surface to a relatively reduced end in the direction of the end of said second lateral interior surface removed from said internal shoulder surface, said first lateral interior surface enclosing and being in contact with said lateral exterior surface of said end region of said first conduit member, said internal shoulder surface being at least closely adjacent said end surface thereof, and said second lateral interior surface enclosing and being in contact with said lateral exterior surface of said second conduit member, (2) a first compression fitting surrounding said ferrule, said first compression fitting having an interior surface tapered in the same direction as said first tapered exterior surface of said ferrule in an undeformed condition with said tapered interior surface of said first compression fitting enclosing and being in contact with at least a substantial portion of said first tapered exterior surface, and (3) a second compression fitting surrounding said ferrule, said second compression fitting having an interior surface tapered in the same direction as said second tapered exterior surface of said ferrule in an undeformed condition with said tapered interior surface of said second compression fitting enclosing and being in contact with at least a substantial portion of said second tapered exterior surface, said second compression fitting being connected to said first compression fitting and said first and second compression fittings compressing said first and second lateral interior surfaces respectively of said ferrule against said lateral exterior surfaces of said first and second conduit members and deforming said first and second tapered exterior surfaces of said ferrule plastically, the included angle of said tapered interior surface of said first compression fitting being at least slightly smaller than the included angle of said first tapered exterior surface of said ferrule in an undeformed condition and there being an internal shoulder surface extending outwardly from the relatively enlarged end of said tapered interior surface of said first compression fitting and forming a corner thereat which is embedded in said first tapered exterior surface of said ferrule, and the included angle of said tapered exterior surface of said second compression fitting being at least slightly smaller than the included angle of said second tapered exterior surface of said ferrule in an undeformed condition and there being an internal shoulder surface extending outwardly from the relatively enlarged end of said tapered interior surface of said second compression fitting and forming a corner thereat which is embedded in said second tapered exterior surface of said ferrule.

3. In a conduit coupling whereby a first conduit member is coupled at an end region on a lateral exterior surface thereof terminating at an end surface and a second conduit member is coupled at an end region on a lateral exterior surface thereof terminating at an end surface, the improvement which comprises (1) a ferrule having (i) a first lateral interior surface, (ii) a second lateral interior surface of a diameter smaller than that of said first lateral interior surface extending from one end of said first lateral interior surface, (iii) a third lateral interior surface of diameter larger than that of said second lateral interior surface extending from the end of said second lateral interior surface removed from said first lateral interior surface, (iv) a first internal shoulder surface at the adjacent ends of said first and second lateral interior surfaces, (v) a second internal shoulder surface at the adjacent ends of said second and third lateral interior surfaces, (vi) a first tapered exterior surface surrounding at least a substantial portion of said first lateral interior surface and converging distantly from said first internal shoulder surface and more distantly from said second internal shoulder surface to a relatively reduced end, and (vii) a second tapered exterior surface surrounding at least a substantial portion of said third lateral interior surface and converging distantly from said second internal shoulder surface and more distantly from said first internal shoulder surface to a relatively reduced end, said first lateral interior surface enclosing and being in contact with said lateral exterior surface of said end region of said first conduit member, said first internal shoulder surface being at least closely adjacent said end surface thereof, said third lateral interior surface enclosing and being in contact with said lateral exterior surface of said end region of said second conduit member, and said second internal shoulder surface being at least closely adjacent said end surface thereof, (2) a first compression fitting surrounding said ferrule, said first compression fitting having an interior surface tapered in the same direction as said first tapered exterior surface of said ferrule in an undeformed condition with said tapered interior surface of said first compression fitting enclosing and being in contact with at least a substantial portion of said first tapered exterior surface, and (3) a second compression fitting surrounding said ferrule, said second compression fitting having an interior surface tapered in the same direction as said second tapered exterior surface of said ferrule in an undeformed condition with said tapered interior surface of said second compression fitting enclosing and being in contact with at least a substantial portion of said second tapered exterior surface, said second compression fitting being connected to said first compression fitting and said first and second compression fittings compressing said first and third lateral interior surfaces respectively of said ferrule against said lateral exterior surfaces of said first and second conduit members and deforming said first and second tapered exterior surfaces of said ferrule plastically, the included angle of said tapered interior surface of said first compression fitting being at least slightly smaller than the included angle of said first tapered exterior surface of said ferrule in an undeformed condition and there being an internal shoulder surface extending outwardly from the relatively enlarged end of said tapered interior surface of said first compression fitting and forming a corner thereat which is embedded in said first tapered exterior surface of said ferrule, and the included angle of said tapered interior surface of said second compression fitting being at least slightly smaller than the included angle of said second tapered exterior surface of said ferrule in an undeformed condition and there being an internal shoulder surface extending outwardly from the relatively enlarged end of said tapered interior surface of said second compression fitting and forming a corner thereat which is embedded in said second tapered exterior surface of said ferrule.

References Cited

UNITED STATES PATENTS

| 2,233,214 | 2/1941 | Lamont | 285—341 |
| 2,463,407 | 3/1949 | Melton | 285—341 |
| 3,233,926 | 2/1966 | Walterscheid-Müller | 285—341 |

FOREIGN PATENTS

| 981,445 | 1/1965 | Great Britain. |
| 786,558 | 1/1935 | France. |
| 1,453,647 | 8/1966 | France. |

CARL W. TOMLIN, Primary Examiner

W. L. SHEDD, Assistant Examiner

U.S. Cl. X.R.

277—110, 212, 236; 285—353, 382.7